3,545,252
FLAMMABILITY TEST CHAMBER
Carlos L. Springfield and William J. Paton, Titusville, and John D. Jeter, Cocoa, Fla., assignors to the United States of America as represented by the Administrator of the National Aeronautics and Space Administration
Filed July 30, 1969, Ser. No. 845,973
Int. Cl. G01n 25/00
U.S. Cl. 73—15                                  3 Claims

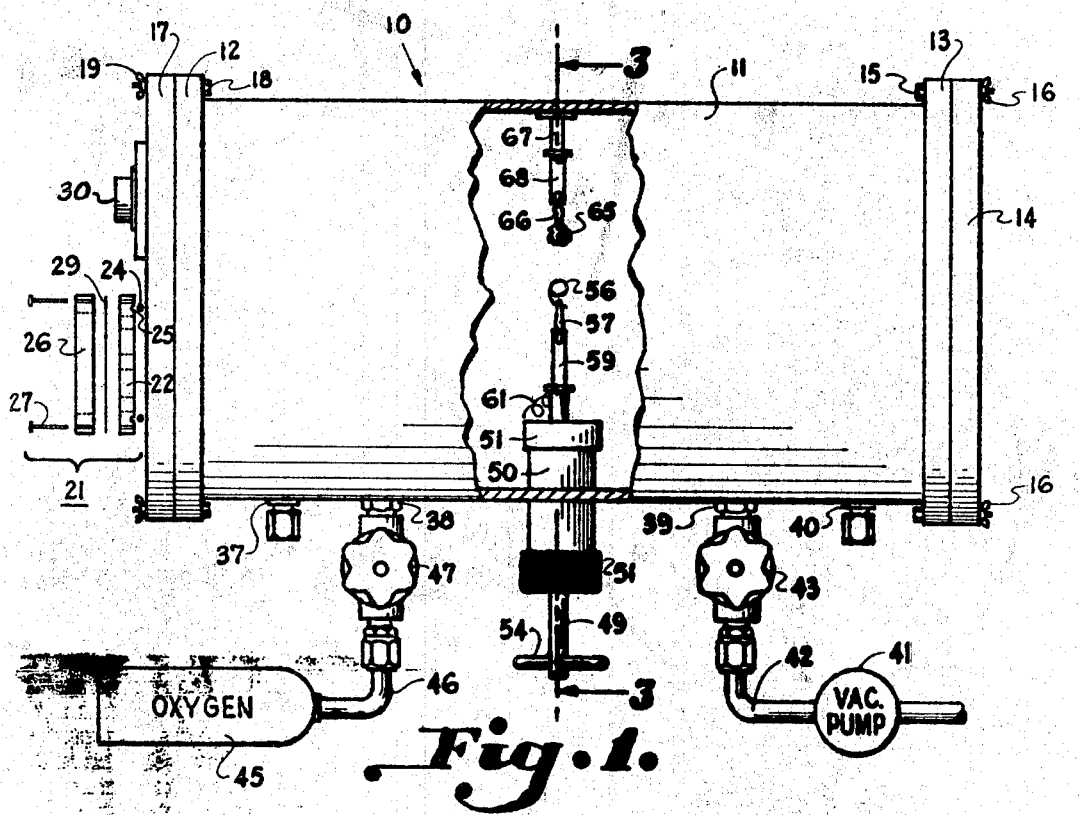
*Fig.1.*
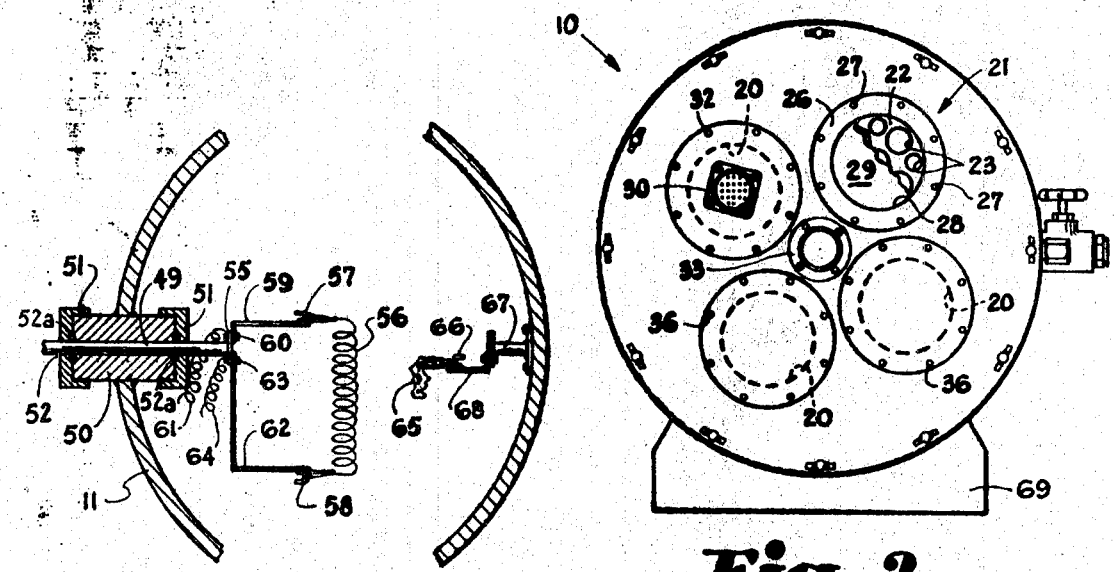
*Fig.3.*
*Fig.2.*
INVENTORS
CARLOS L. SPRINGFIELD
WILLIAM J. PATON
JOHN D. JETER
BY James D. Harrell
ATTORNEYS

United States Patent Office 3,545,252
Patented Dec. 8, 1970

ABSTRACT OF THE DISCLOSURE

A flammability test chamber for testing materials in certain predetermined environments. The test chamber includes an elongated chamber having a transparent hermetically sealed shield adjacent one end. A plurality of cutouts are carried on the other end with a rupture disk positioned over one of said cutouts which prevents build up of pressure within the chamber beyond a given level. The chamber can be evacuated by a vacuum pump and gas can be inserted therein to produce a desired environment. A probe extends through the wall of the chamber for rotating an implement carried on the end thereof, as well as moving such forward and backward during a test.

---

This invention described herein was made by employees of the United States Government, and may be manufactured and used by or for the Government for governmental purposes without the payment of any royalties thereon or therefor.

This invention relates to a flammability test chamber, and more particularly to a test chamber wherein the material to be tested can be readily exposed to different environmental conditions and maneuvered therein.

In recent years it has become necessary to test certain materials, such as used in spacecrafts or any other confined area in various environments so as to determine the safety of using such therein. It is important to know the flame propagation of the material, as well as to determine if certain mechanical movements of apparatus will create a spark to ignite the material.

In accordance with the present invention it has been found that the flammabilty of certain materials can be readily determined by a test chamber constructed in accordance with the present invention. This test chamber includes the following basic parts: (1) An elongated cylindrical chamber, (2) a transparent hermetically sealed shield carried on one end of the chamber for permitting observation of the interior of the chamber, (3) a hermetically sealed plate assembly carried on the other end of the chamber, (4) the plate assembly includes a plurality of cutouts for accommodating various components to be used during the tests, (5) a rupture means positioned over one of said cutouts for preventing a pressure build up within the chamber beyond a predetermined level, (6) a vacuum pump communicating with said chamber for evacuating such prior to running tests, (7) a source of gas coupled to said chamber for selectively producing a particular gaseous environment within the chamber, (8) probe means for positioning said test material at a predetermined position within ths chamber, (9) and a heating means for providing heat to said material being tested.

Accordingly, it is an important object of the present invention to provide a safe means of accurately testing materials for flammability in certain predetermined environments.

Another important object of the present invention is to provde a flammablity test chamber in which the material being tested can be readily manipulated.

Still another important object of the present invention is to provide a flammability test chamber in which the pressure therein can vary, but is provided with a rupture means which prevents the pressure from building up beyond a predetermined level.

Still another important object of the present invention is to provide a simple flammability test chamber in which a flame propagation test can be readily observed.

Other objects and advantages of this invention will become more apparent from a reading of the following detailed description and appended claims, taken in conjunction with the accompanying drawing wherein:

FIG. 1 is a plan view illustrating a test chamber constructed in accordance with the present invention, FIG. 2 is an elevational view looking at one end of the test chamber illustrated in FIG. 1 showing components mounted on an end assembly plate, and FIG. 3 is an enlarged fragmentary cross-sectional view taken along line 3—3 of FIG. 1.

Referring in more detail to the drawing, a flammability test chamber, generally designated by the reference character 10, is illustrated and is provided for testing certain materials in a predetermined gaseous environment. While the primary discussion of the test chamber is related to testing polymers, elastomers and fabrics, it is to be understood that many other devices, both mechanical and electrical, can be tested in order to determine if the operation of such could possibly cause an explosion or fire within a particular gaseous environment. For example, the test chamber could be utilized to determine if the connecting or disconnecting of an electrical apparatus could possibly cause a spark sufficient to produce an explosion in an atmosphere of explosive gases, such as oxygen.

The flammability test chamber includes an elongated rigid cylindrical chamber 11, which in one particular embodiment, may be constructed of a 12″ diameter steel pipe. Radially extending flange portions 12 and 13 are welded to opposite ends of the cylindrical chamber 11. The flange portions 12 and 13 extend outwardly from the wall of the pipe permitting the inside of the pipe to be readily accessible. A transpraent hermetically sealed shield 14 is carried on one end of the chamber for permitting observation of the interior of the chamber during a test. The shield may be constructed of any suitable transparent material, such as plexiglass, and is attached to the flange portion 13 by circumferentially spaced bolts 15 which extend through the flange portion 13 and holes are provided in the plexiglass member 14. Wing nuts 16 are positioned on the other end of the bolts 15 for drawing the plexiglass shield 14 flush against the flange member 13. An O-ring (not shown) is provided in a circumferential groove extending around the flange member 13 and extends slightly out of the groove towards the plexiglass shield 14 so that when the shield 14 is drawn tightly against the flange member 13 such is hermetically sealed.

A hermetically sealed plate assembly 17 is carried on the other end of the chamber 11 and may be constructed of any suitable material, such as stainless steel. Flange member 12 also has a circumferential groove in its outer surface for receiving an O-ring (not shown) so that when the plate assembly 17 is drawn tight aginst the flange 12 by means of the bolts 18, which extend through the flange member 12 and the plate assembly 17, a hermetically sealed relationship exists. Wing nuts 19 are provided on the outer end of the bolts for drawing plate assembly 17 flush against the flange member 12.

The plate assembly includes cutouts 20, shown in broken lines, which are provided for accommodating various components to be used during a test. One of the components is a rupture means, generally designated by the reference character 21, which prevents pressure build up within the chamber beyond a predetermined point. In one particular test it is desired that the pressure within the chamber not be allowed to build up more than four pounds above atmospheric pressure.

The rupture means 21 includes an inner disk 22 which has a plurality of various size holes 23 therein which communicates with the interior of the chamber 11. An O-ring is carried within a circumferential groove 25 which faces the plate assembly 17 for producing an air tight seal when the inner disk 22 is drawn tightly against the plate assembly 17. An outer disk 26 is drawn flush against the inner disk and the plate assembly 17 by bolts 27 which are circumferentially spaced therearound and are screwed into the face of the plate assembly 17. The outer disk has a large opening 28 therein. Sandwiched between the inner disk 22 and the outer disk 26 is a thin rupture disk 29 constructed of any suitable material, such as tin foil which will rupture when exposed to a certain predetermined pressure. For example, if the pressure build up within the chamber 11 is more than four pounds greater than atmospheric pressure, then this four pounds difference will force the rupture disk 29 to rupture since such is only supported about its peripheral edge by the outer disk 26. However, if during a test the chamber 11 is evacuated to substantially "zero" pressure, then it is desired that the rupture disk 29 not be ruptured by the difference between the atmospheric pressure 14.7 p.s.i. on the outside of the chamber, and the "zero" p.s.i. on the inside of the chamber. The disk 29 does not rupture when the chamber 10 is evacuated because there is more surface area of the inner disk 22 engaging the rupture disk 29 preventing such from rupturing inwardly than there is exerted by the outer disk 26 when the pressure on the inside of the chamber is greater than the pressure on the outside. One suitable rupture disk is constructed of conventional household aluminum foil.

Another component mounted over a cutout 20 is an electrical connector 30 which is mounted on a plate 31. The plate 31 is, in turn, bolted in the plate assembly 17 by circumferentially spaced bolts 32. O-rings (not shown) are positioned between the plate 31 and the plate assembly 17, as well as between the electrical connector 30 and the plate 31 for producing a hermetically sealed fitting. Through this electrical connector 30 electric energy can be supplied to the interior of the chamber 11 during a test.

A small plexiglass viewing plate 33 is bolted over a cutout in the center of the plate assembly 17 and has an O-ring interposed therebetween for providing a sealed fit. Through this plexiglass plate the interior of the test chamber can be observed. Blank plates 34 and 35 are carried over the other two cutouts in the plate assembly 17 and secured thereto by bolts 36. An O-ring is also positioned between the plates 34 and 35 and the plate assembly 17, providing a sealed fitting. The blank plates may be removed and other components, such as means for positioning elements within the chamber, or electrical connections, can be substituted therefor.

A plurality of couplings 37, 38, 39 and 40, respectively, are positioned in the wall of the chamber for providing communication therewith. A vacuum pump 41 is coupled through tube 42, a control valve 43, to coupling 39 for evacuating the test chamber prior to running a test. After the test chamber has been evacuated oxygen can be supplied to the test chamber 11 from any suitable source such as a tank 45, tube 46, control valve 47, and the coupling 38. In other words, by opening the valve 47 a predetermined amount of oxygen can be delivered to the chamber.

Means for positioning said material in said chamber is generally designated by the reference character 48 and includes an elongated rod shaped member 49 which extends through a fixed bearing 50 extending through the side of the housing. The bearing 50 is cylindrical in shape and has a bore extending longitudinally therethrough for closely receiving the rod 49. The bearing 50 is welded to the wall of the chamber 11 to provide an air tight coupling. A pair of cup shaped members 51 are threaded on opposite ends of the bearings 50 and have an opening 52 in the center thereof through which the rod 49 passes. O-rings 51a are positioned on the rod 49 between the ends of the bearing 50 and the cup shaped members 51 for providing an air tight seal around the rod 49. A laterally extending handle 54 extends through the outer end of the rod 49 and is fixed thereto by any suitable means so as to manipulate the rod 49. Connected to the inner end of the rod 49 is a flat vertical plate 55 provided for accommodating components used in the test.

As shown in FIG. 3, a heating coil 56 is carried between a pair of alligator clips 57 and 58, respectively. Alligator clip 57 is secured to a relatively rigid arm 59 which has its other end attached to a bolt 60 extending through the flat plate 55. The bolt 60 is insulated by any suitable means from the plate 55, and is in turn, electrically connected to a wire 61. The other alligator clip 58 is connected through an arm 62 to still another bolt 63 extending through the flat plate 55. An electrical wire 64 is connected to the other side of the bolt 63 which is, in turn, insulated from the flat plate 55 by any suitable means. The wires 61 and 64 are, in turn, connected to terminals on the electrical connector 30 so that electrical energy can be supplied to the coil 56 for heating such.

The material 65 being tested is carried by an alligator clip 66 which is, in turn, bolted to an inwardly projecting standard 67 through arm 68. The standard 67 is attached by any suitable means to the side wall 11 of the chamber opposite the heating coil 56. During the test it can be seen by pulling the rod 49 by means of the handle 54 forward and backward such will vary the distance between the heating coil 56 and the material 65, thus varying the heat applied thereto. Also, the heating coil can be used for igniting test materials by pushing the coil against the material, thereby determining the material's flammability characteristics in predetermined environments. The rod 49 can also be rotated in order to change the position of the heating coil 56 relative to the material 65 being tested. Other probes similar to the rod 49 may be inserted through one of the circular plates 34 or 35 for manipulating components, such as thermocouples, etc. It is, also, to be understood that any desired gas may be supplied to the chamber creating a particular gaseous environment during the flammability test.

We claim:

1. A flammability test chamber for testing materials in certain predetermined environments comprising:
   (A) an elongated sealed cylindrical chamber,
   (B) a hermetically sealed plate assembly on the one end of said chamber,
   (C) said plate assembly including cutouts for accommodating various components to be used during a test,
   (D) one of said components being a rupture means which prevents pressure build up within said chamber beyond a predetermined level,
   (E) said rupture means including an inner disk carried over one of said cutouts and having a plurality of openings therein,
   (F) a thin rupture disk of a predetermined thickness carried flush against said inner disk, and
   (G) an outer disk having a large opening therein carried flush against said rupture disk whereby a greater pressure difference is necessary to rupture said rupture disk inwardly than outwardly,
   (H) a plurality of couplings carried by said chamber providing communication with the interior of said chamber, (I) a vacuum pump coupled to one of said couplings for evacuating said test cell prior to running a test on said material, (J) a source of gas coupled to another coupling for selectively producing a particular environmental condition within said chamber, (K) means for positioning said material being tested at a predetermined position within said chamber, and (L) an adjustable heating means in the vicinity of said material for use in determining the flammability characteristics of said material.

2. The flammability test chamber as set forth in claim 1 wherein said adjustable heating means further includes:

(A) an elongated rod shaped member, (B) said rod shaped member extending through said wall of said chamber having one end within said chamber and the other end outside of said chamber, (C) a heating element being attached to said one end of said rod shaped member, and (D) means carried on the other end of said rod shaped member for rotating said heating element, and moving the heating element forward and backward relative to said material being tested.

3. The test chamber as set forth in claim 1 further comprising:

(A) a transparent hermetically sealed shield carried on the other end of said chamber for permitting observation of the interior of said chamber.

References Cited

UNITED STATES PATENTS

| | | | |
|---|---|---|---|
| 2,636,388 | 4/1953 | Blegen | 73—15 |
| 3,088,309 | 5/1963 | White et al. | 73—15 |

JAMES J. GILL, Primary Examiner

H. GOLDSTEIN, Assistant Examiner

U.S. Cl. X.R.

73—432